(12) United States Patent
Kelly et al.

(10) Patent No.: US 9,886,018 B2
(45) Date of Patent: Feb. 6, 2018

(54) PUMP CONTROL FOR OPERATION ON A VARIABLE PRESSURE FORCE MAIN

(71) Applicant: Smith & Loveless Inc., Lenexa, KS (US)

(72) Inventors: John K. Kelly, Prairie Village, KS (US); Robert A. Grove, Shawnee, KS (US); Rodney S. Mrkvicka, Leawood, KS (US); Donald J. Aholt, Lenexa, KS (US)

(73) Assignee: Smith & Loveless Inc., Lenexa, KS (US)

( * ) Notice: Subject to any disclaimer, the term of this patent is extended or adjusted under 35 U.S.C. 154(b) by 297 days.

(21) Appl. No.: 14/852,911

(22) Filed: Sep. 14, 2015

(65) Prior Publication Data

US 2016/0076549 A1 Mar. 17, 2016

Related U.S. Application Data

(60) Provisional application No. 62/049,839, filed on Sep. 12, 2014.

(51) Int. Cl.
| | |
|---|---|
| G05B 19/05 | (2006.01) |
| F04D 15/00 | (2006.01) |
| G01F 1/34 | (2006.01) |
| G05D 7/06 | (2006.01) |
| F04D 1/00 | (2006.01) |

(52) U.S. Cl.
CPC ....... G05B 19/054 (2013.01); F04D 15/0066 (2013.01); F04D 15/0088 (2013.01); G01F 1/34 (2013.01); G05D 7/0676 (2013.01); F04D 1/00 (2013.01); G05B 2219/1161 (2013.01)

(58) Field of Classification Search
CPC ............ H01L 21/681; H01L 21/67201; H01L 21/682; G06T 7/73; G06T 7/0004; G06T 2207/30148; Y10S 901/47; Y10S 901/02
USPC .......................................................... 700/282
See application file for complete search history.

(56) References Cited

U.S. PATENT DOCUMENTS

| | | | |
|---|---|---|---|
| 5,240,380 A * | 8/1993 | Mabe ................. | F04D 15/0066 417/43 |
| 8,249,826 B1 | 8/2012 | Anderson et al. | |
| 8,417,384 B2 | 4/2013 | Anderson et al. | |
| 8,444,394 B2 | 5/2013 | Koehl | |
| 8,540,493 B2 | 9/2013 | Koehl | |
| 8,801,389 B2 | 8/2014 | Stiles, Jr. et al. | |
| 8,840,376 B2 | 9/2014 | Stiles, Jr. et al. | |

(Continued)

OTHER PUBLICATIONS

Customized Pmmp Station Solutions, Lindsay, 2 pgs.

(Continued)

*Primary Examiner* — Darrin Dunn
*Assistant Examiner* — Marzia T Monty
(74) *Attorney, Agent, or Firm* — Wood, Phillips, Katz, Clark & Mortimer

(57) ABSTRACT

A pumping unit and method controlling a variable speed pump to output constant flow rate against varying outlet pressure using a controller with stored data curves of flow rate versus discharge pressure for a plurality of pump speeds for the variable speed pump, including a processor determining appropriate pump speed for the sensed discharge outlet pressure by extrapolating between the stored data curves.

4 Claims, 3 Drawing Sheets

(56) References Cited

U.S. PATENT DOCUMENTS

2011/0189028 A1* 8/2011 Shampine .............. F04B 49/06
                                                    417/53
2013/0287596 A1* 10/2013 Geneau .............. F04D 15/0022
                                                    417/44.1
2014/0048156 A1* 2/2014 Smaidris ................ C02F 1/006
                                                    137/395

OTHER PUBLICATIONS

Lift Station Brain—Vikycalc RT, Maid Labs Technologies, pp. 1-3.
Ew Load Sharing U.S. Patent Announcement, 4 pgs.
Development of a Smart Pumping System, Stavale et al, IIT Industries, Fluid Technology Corporation, pp. 67-76.
Toshiba VLP Drive Software, Bihler et al, Toshiba International Corporation (2011), pp. 1-17.
ABB Energy Efficiency solutions, Simple steps to reduce fuel consumption, Rasanen, Marine Energy Solutions, ABB Marine Services, (Jul. 11, 2012), 24 pages.

* cited by examiner

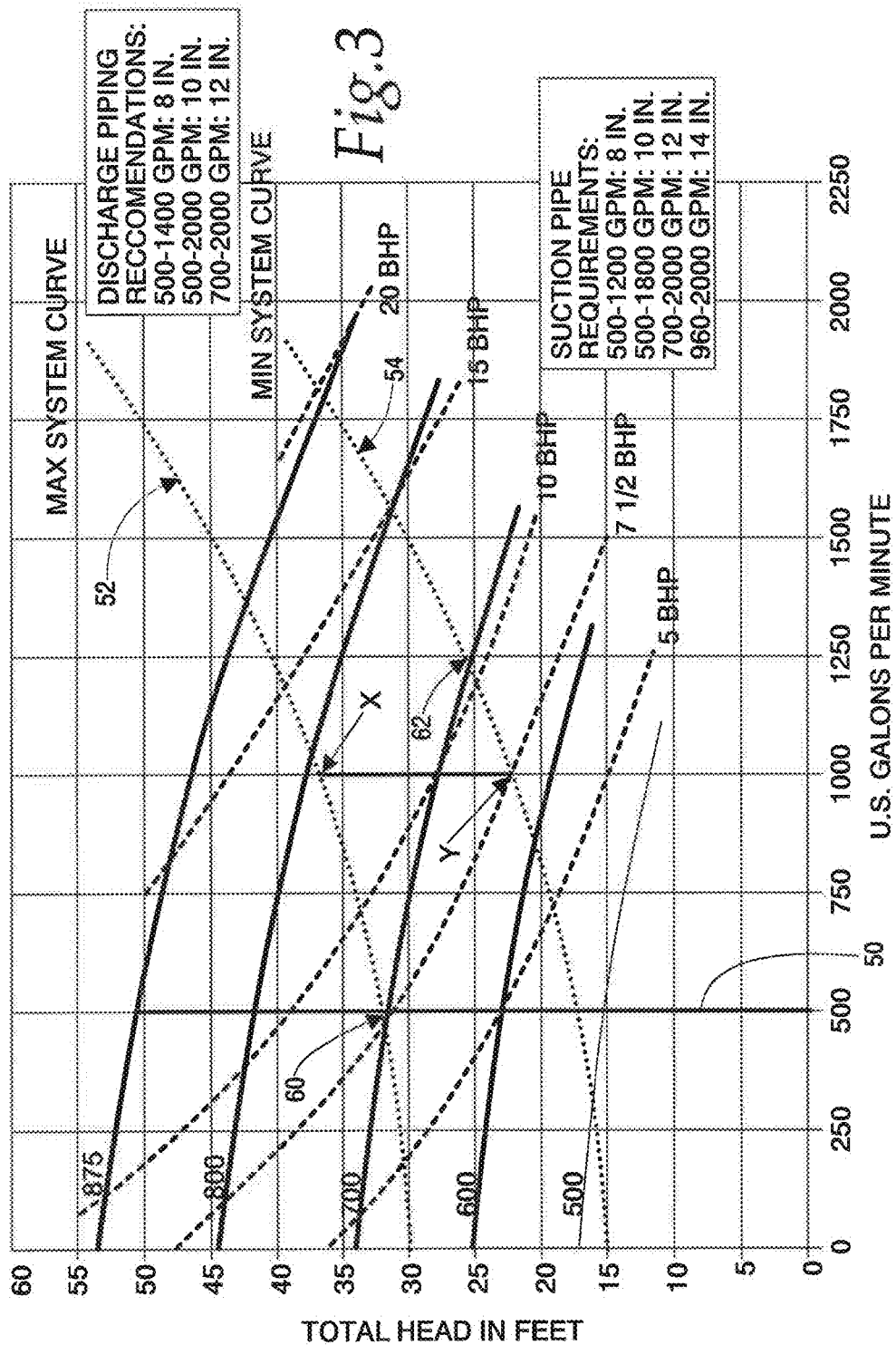

US 9,886,018 B2

PUMP CONTROL FOR OPERATION ON A VARIABLE PRESSURE FORCE MAIN

CROSS-REFERENCE TO RELATED APPLICATIONS

This is a non-provisional application claiming priority to U.S. Provisional Application Ser. No. 62/049,839, entitled "Pump Control for Operation on a Variable Pressure Force Main" and filed Sep. 12, 2014.

FEDERALLY SPONSORED RESEARCH OR DEVELOPMENT

Not Applicable.

MICROFICHE/COPYRIGHT REFERENCE

Not Applicable.

FIELD OF THE INVENTION

The present invention relates to pump systems, and more particularly to pump systems which encounter fluctuating discharge pressures.

BACKGROUND OF THE INVENTION

Constant speed centrifugal pumps may be advantageously used to pump into a pressurized pipe such as used to carry water or sewage (also known as a force main). In such environments, the discharge pressure of the pump may vary for a variety of reasons (e.g., discharge conditions and/or the presence of multiple stations discharging into a common force main). Since the pump discharge flow rate is dependent on the total head or pressure that the pump must overcome (generally, the higher the head level, the less the pump will discharge), in environments where the total head in the discharge main that the pump must overcome varies, the discharge volume from the pump will vary, with relatively high flow at low force main pressures and relatively low flow at high force main pressures.

However, some pumping applications require that a consistent flow be discharged notwithstanding the variable discharge pressures, with varying flow potentially leading to issues such as pump damage, overloading of the motor, and/or failure to pump the liquid from the station leading to overflow conditions.

Various pump operations have been used in an attempt to maintain a flow rate in environments where outlet pressure fluctuates. For example, U.S. Pat. No. 7,040,868 addresses air plugs encountered by fire engines (i.e., where the pump is expected to intermittently pump gasses) and uses an engine governor which controls the operating speed of the engine, with the controller overriding the governor to control the engine.

Still other designs have been used for controlling pumps based on various encountered conditions, including those disclosed in U.S. Pat. Nos. 6,178,393, 7,308,906, 8,249,826, 8,417,483, 8,444,394, 8,540,493, 8,801,389 (Publ. No. US2011/0076156), and U.S. Pat. No. 8,840,376 (Publ. No. US2010/0247332).

The present invention is directed toward providing a pump and method in which a constant flow rate will be reliably delivered notwithstanding changing pressure in the system.

SUMMARY OF THE INVENTION

In one aspect of the present invention, a pumping unit adapted to pump fluid at a selected flow rate is provided, including a selected variable speed pump having a discharge outlet, a pressure sensor at the pump discharge outlet, a controller connected to the pump to control the speed of the pump, and a link providing the discharge outlet pressure sensed by the sensor to the controller. The controller includes a memory storing data curves of flow rate versus discharge pressure for a plurality of pump speeds for the selected pump, and a processor adapted to determine the pump speed which will provide the selected flow rate for the sensed discharge outlet pressure by extrapolating between the stored data curves.

In one form of this aspect of the present invention, the memory stores data curves for first, second, third and fourth pump speeds, and the processor determines the pump speed by determining the two data curves closest to the sensed pressure for the selected flow rate and selecting a pump speed which is proportionately the same between the pump speed of the two closest data curves as the sensed discharge pressure is between the pressure of the two closest data curves at the selected flow rate.

In another form of this aspect of the present invention, the sensor is a pressure transducer.

In still another form of this aspect of the present invention, a plurality of pumping units pump into a force main, and at least one of the pumping units is a pumping unit according to this aspect of the invention.

In another aspect of the present invention, a method of controlling a selected pump to pump a constant flow rate of a fluid against changing pressures is provided, including (1) storing, in a memory, a plurality of data curves of flow rate versus discharge pressure for a plurality of pump speeds for the selected pump, (2) continually sensing pressure by a sensor at the discharge outlet of the pump, (3) signaling the sensed pressure to a controller having a processor, (4) in the processor, determining the pump speed which will provide the selected flow rate for the sensed discharge outlet pressure by extrapolating between the stored data curves, and (5) controlling the selected pump to operate at the determined pump speed.

In another form of this aspect of the invention, the plurality of data curves are for pump speeds spaced in uniform increments, with first, second, third and fourth data curves indicating the fluid flow rates discharged from the selected pump over a range of fluid pressures at the pump discharge for first, second, third and fourth pump speeds, respectively, and extrapolating between data curves includes determining on the processor (a) the two data curves closest to the sensed pressure for the selected flow rate, (b) the relative position of the sensed discharge pressure between the discharge pressure of the closest two data curves for the selected flow rate, and (c) a desired pump speed which is the same relative position between the pump speeds of the closest two data curves as the relative position of the sensed discharge pressure between the discharge pressure of the closest two data curves for the selected flow rate.

Other objects, features, and advantages of the invention will become apparent from a review of the entire specification, including the appended claims and drawings.

BRIEF DESCRIPTION OF THE DRAWINGS

FIG. 3 is an example set of system curves for a pump, which curves may be advantageously used to program the controller.

DETAILED DESCRIPTION OF THE PREFERRED EMBODIMENT

To overcome potential problems such as described above, a pump system is provided with an automatic pump control system that alters the pump operation based on conditions at the pump station's discharge and on actual operation of the pumps) used in the system.

Figure 1:
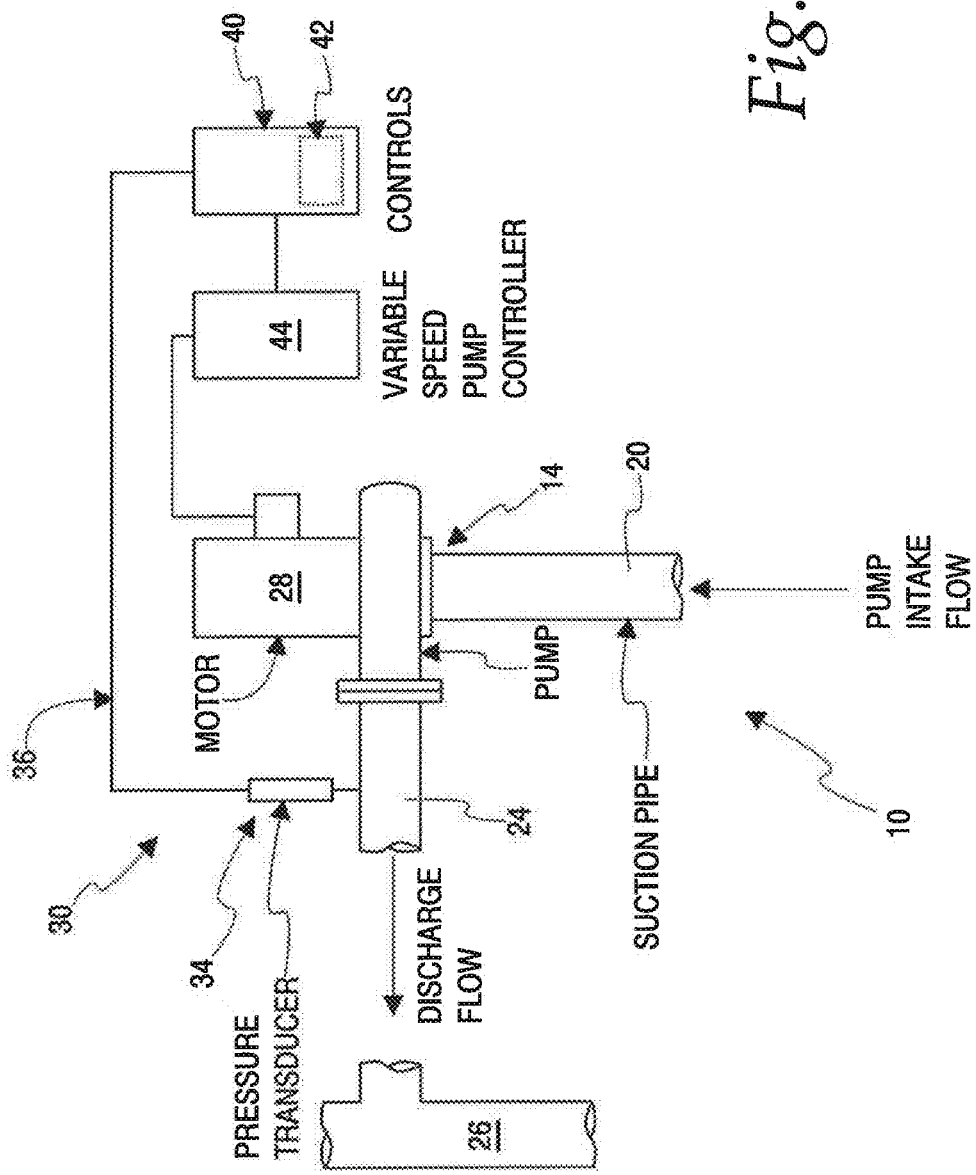
FIG. 1 is a diagram of an embodiment of an advantageous pump station.

As illustrated in FIG. 1, a pump station 10 includes a suitable pump 14 (such as a constant speed centrifugal pump) having an input (suction pipe 20) and a discharge 24 which discharges into, for example, a force main 26 and therefore encounters the variable pressures of the force main. The pump 14 also includes a motor 28.

A control 30 is advantageously provided for the pump 14 as schematically illustrated in FIG. 1. Specifically, a pressure sensor 34 is provided at the pump discharge 24, which sensor 34 provides a signal via link 36 to a controller 40 such as a programmable logic controller (PLC) reflective of the pressure sensed at the pump discharge 24. The controller 40 includes memory 42 in which the pump system curve (FIG. 3) may be stored.

The controller 40 determines the operating speed required of the motor 28 to maintain a selected discharge flow rate at the sensed discharge pressure based on the pump system curve (FIG. 3), and signals that speed to variable speed pump controller (variable frequency drive, or VFD) 44. The VFD 44 in turn provides the power which then drives the pump motor 28 to operate at the desired pump speed.

A PLC 40 advantageously permits the input signal to be refined based on system characteristics as further described below, where a modified analog output is sent to the variable speed pump controller 44.

Figure 2:
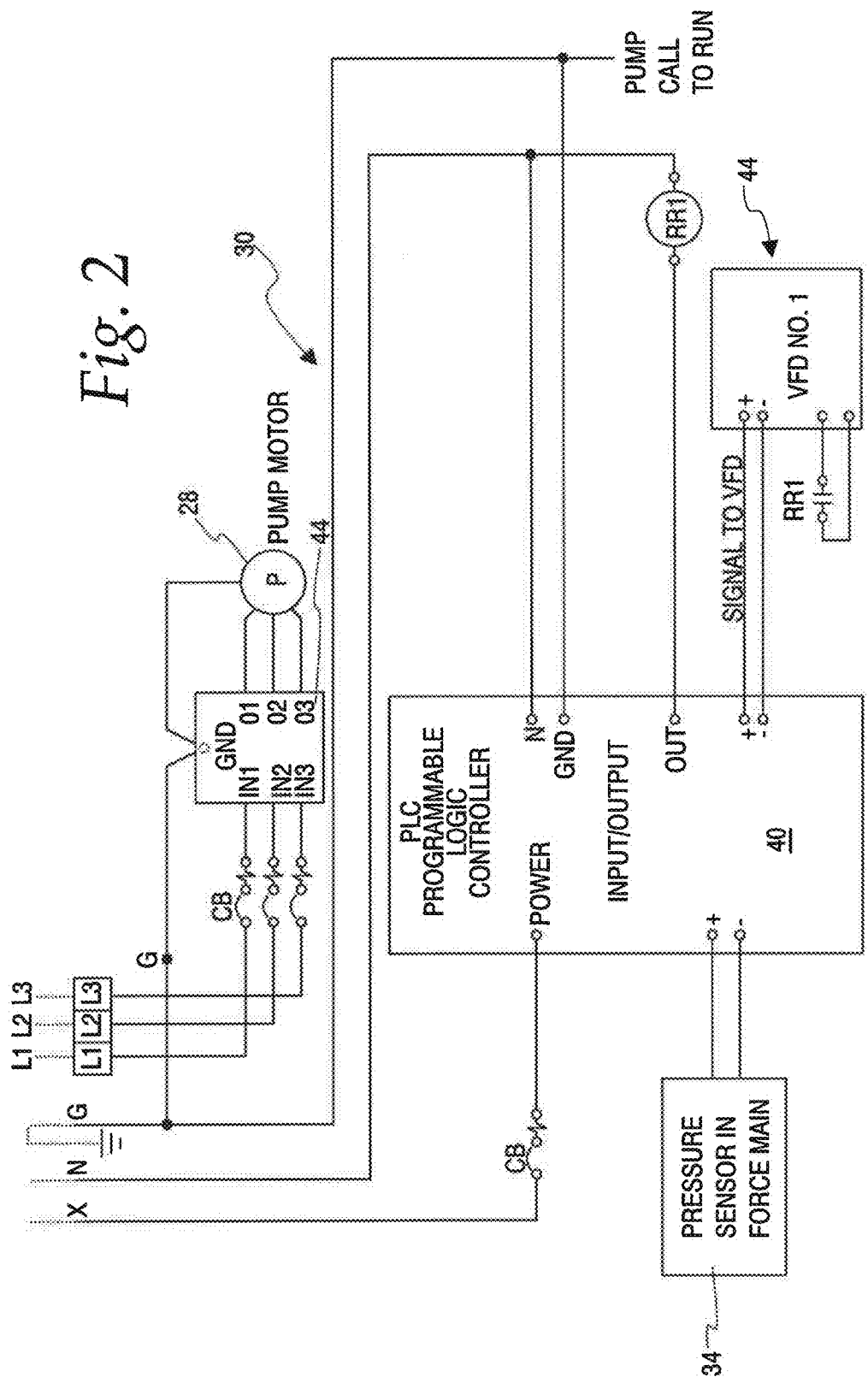
FIG. 2 is a circuit diagram of a controller suitable for use with the pump station of FIG. 1.

FIG. 2 includes a diagram of a control 30 suitable for the above operation, illustrating a control circuit having simplified controls when a programmable logic controller (PLC) 40 is used. The top of FIG. 2 shows the three phase power going to the circuit breaker (CB), variable frequency drive (VFD) 44 and the pump motor. The pressure sensor 34 provides the input to the PLC 40, which outputs a control signal to the VFD 44 at the bottom right of FIG. 2.

Generally, in order to have the pump run at a consistent desired flow rate, the pump speed (i.e., the speed of the pump motor 28) will be controlled to increase if the discharge (e.g., force main) pressure increases and decrease if the force main pressure decreases. More specifically, the PLC 40 may advantageously be controlled to operate based on system information including suitably determined pump performance data. Such pump performance data may be determined, for example, from the pump curve often available from the pump manufacturer, or advantageously by suitable testing of the pump.

More specifically, system curves (pressure versus flow developed by the force main system) may be based on conditions at the installation. For example, the system curve may be a combination of the "static" head (i.e., the elevation difference that the pump must "lift" the liquid-level at the final pump discharge point minus the elevation of the water at the pump itself), and "dynamic" head (e.g., the friction losses developed by the fluid to traveling through the system). Friction losses are calculated based on the fluid velocity and, as the discharge flow increases, the velocity through the discharge piping and other devices (elbows, meters, valves) increases, so that the more liquid pumped, the more dynamic friction head that will be developed.

FIG. 3 shows an exemplary pump system curve which may be advantageously used to program the PLC 40 in accordance with the present invention. The FIG. 3 chart includes maximum and minimum system curves, which may be determined from a plot of total head versus flow.

In FIG. 3, the lines labeled as 875, 800, 700, 600, 500 are rotational speeds (in rpm) for a particular impeller (La, for the same impeller diameter), and show the total head created by the pump versus flow rate for the pump running at that specific speed. The VFD may operate the pump 14 at other speeds as well using the VFD 44, with the data for such speeds readily interpolated between those in FIG. 3. As can be seen from FIG. 3, if the pump speed is slowed down, it can pump at the same flow rate with less total head (e.g., by shifting down from the 800 rpm curve to the 700 rpm curve), or it can pump at lower flow rate with the same head when compared to the higher speed (e.g., by shifting left from the 800 rpm curve to the 700 rpm curve).

The lines labeled 5, 7½, 10, 15 and 20 BHP in FIG. 3 show the motor horsepower draw to run at that point on the curve(s). This information allows for determination that the motor is sufficiently sized so that it can run at all anticipated points without the horsepower draw exceeding the motor horsepower. This thus advantageously permits limiting the flow and facilitates determination of suitable pump motor 28, enabling use of smaller pump motors than might otherwise be used.

In FIG. 3, the vertical line 50 (at 500 gpm) represents an example minimum flow recommended for the pump system 10 being illustrated (if the flow is less than this it may be noisy and can cause damage to the pump). Such information may be included in the PLC 40 to the pump from running below this minimum flow line when the static head increases.

The "max system curve" 52 and "min system curve" 54 in FIG. 3 are plots (determined from the installation data [elevations and friction head]) of flow when under the minimum or maximum static head. There could be additional system curves that would be in between the maximum and minimum and they would have the same shape as those curves depending on the system conditions. However, the system curves are normally drawn for min and max conditions.

It should be appreciated that the pump will operate at a flow rate (i.e., U.S. Gallons Per Minute) at the point in FIG. 3 where the pump running speed line (i.e., appropriate rpm line) crosses the current system line (La, total head). Thus, if a pump is running at 700 rpm and the static head is at the maximum level, the pump would run at 500 gpm and 32' total head (the point 60 where the 700 rpm line crosses the max, system curve). Conversely, if a pump is running at 700 rpm and the static head is at the minimum level, then the pump would run at about 1250 gpm at 26' total head (the point 62 where the 700 rpm line crosses the min. system curve).

In accordance with the disclosure herein, the speed is varied based on the discharge conditions. Thus, as an example using FIG. 3, in order to maintain a 1000 gpm flow rate with the head at the maximum level, the pump would need to produce 37' total head (the head for point X in FIG. 3, which is where the max. system curve crosses the 1000 gpm vertical line). Comparing point X (1000 gpm and 37' total head) to the rotational speed lines and extrapolating between the 700 and 800 rpm curves shows that approximately 795 rpm for the pump would be required to run at 1000 gpm and 37' total head (point X being between the 700 and 800 rpm lines, but substantially closer to the 800 rpm line).

Similarly, if the head is at the minimum level, then the pump would need to produce 22' total head (the head for point Y in FIG. 3, where the min. system curve crosses the 1000 gpm vertical line). Comparing point Y (1000 gpm and 22' total head) to the rotational speed lines by extrapolating between the nearest lines (i.e., for 600 and 700 rpm) shows that approximately 625 rpm for the pump would be required to run at 1000 gpm and 22' total head (point Y being approximately ¼ of the way from the 600 rpm line to the 700 rpm line).

Therefore, using the above examples, if the sensor 34 were to detect that the discharge pressure dropped from 37' to 22' head (16 to 9.5 psi), the controller 40 would extrapolate the pump system curve data in memory 42 to drop the operating speed of the pump from 795 rpm to 625 rpm to achieve a consistent discharge rate of 1,000 gpm.

Such data can be stored and used by the controller (PLC) 40 to automatically and continuously control the rotational rate of the pump motor 28 to achieve the desired discharge rate notwithstanding varying discharge pressures.

It should therefore be appreciated that the controller 40 programmed as described herein will cause the pump station 10 to discharge a consistent desired flow rate into the force main even when the force main has variable pressures caused by factors unrelated to the pump station 10. For example, in environments in which a pump station 10 discharges into a force main having other pumps also discharging into the force main, the discharge pressure at the station 10 may frequently increase or decrease significantly based on whether the additional pumps are operating or not. The control 30 would detect any such increase or decrease in pressure and, based on the stored pump curve data, the PLC 40 would determine the speed of the motor 28 and control the variable speed pump controller 44 to cause the pump 14 to maintain the desired flow rate by appropriately increasing or decreasing the speed of the motor 28 accordingly. Thus, the pump station 10 will not operate at flow rates which are disadvantageously too high or too low and moreover will automatically adjust the pump operation to maintain a user defined flow volume from the pump 14 no matter what the discharge pressure.

It should also be appreciated that inlet pressure may vary due to a change in water level in the tank or well that the pump is evacuating, and the described pump station 10 will allow for inlet pressure variations to the pump while still maintaining a constant outlet flow. Moreover, by using the pump system curves (FIG. 3) specifically related to the pump 14 of the pump station and extrapolating between such curves for all conditions, ideal operation may be achieved notwithstanding constantly changing conditions. It should also be appreciated that pump stations such as described herein could advantageously be used on a booster pump where the inlet pressure varies.

The invention claimed is:

1. A pumping unit adapted to pump fluid at a selected flow rate, comprising:
    a selected variable speed pump having a discharge outlet;
    a pressure sensor at said pump discharge outlet;
    a controller connected to said pump to control the speed of said pump, said controller including a memory storing data curves of flow rate versus discharge pressure for a plurality of pump speeds for the selected pump, and a processor adapted to determine the pump speed which will provide the selected flow rate for a sensed discharge outlet pressure by extrapolating between the stored data curves;
    and a link providing a discharge outlet pressure sensed by the sensor to the controller;
    wherein said memory stores first, second, third and fourth data curves for first, second, third and fourth pump speeds, each of said data curves associating one of said first, second, third and fourth pump speeds with discharge outlet pressure and flow rate for the selected pump, said processor determines the pump speed by determining the two data curves having a pressure value closest to said sensed pressure for the selected flow rate, and selecting a pump speed which is proportionately same between the pump speed of the two closest data curves as is the sensed discharge pressure between the pressure of the two closest data curves at the selected flow rate.

2. The pumping unit of claim 1, wherein said sensor is a pressure transducer.

3. A fluid pumping system, comprising a plurality of pumping units pumping into a force main, wherein at least one of said pumping units is a pumping unit according to claim 1.

4. A method of controlling a selected pump to pump a constant flow rate of a fluid against changing pressures, comprising:
    storing, in a memory, a plurality of data curves of flow rate versus discharge pressure for a plurality of pump speeds for the selected pump;
    continually sensing pressure by a sensor at a discharge outlet of the pump;
    signaling said sensed pressure to a controller having a processor;
    in said processor, determining the pump speed which will provide the selected flow rate for the sensed discharge outlet pressure by extrapolating between the stored data curves;
    and controlling said selected pump to operate at the determined pump speed;
    wherein said plurality of data curves are for pump speeds spaced in uniform increments, with a first one of said data curves indicating the fluid flow rates discharged from the selected pump over a range of fluid pressures at said pump discharge for a first pump speed, a second one of said data curves indicating the fluid flow rates discharged from the selected pump over a range of fluid pressures at said pump discharge for a second pump speed, a third one of said data curves indicating the fluid flow rates discharged from the selected pump over a range of fluid pressures at said pump discharge for a third pump speed, and a fourth one of said data curves indicating the fluid flow rates discharged from the selected pump over a range of fluid pressures at said pump discharge for a fourth pump speed;
    and said extrapolating between data curves comprises determining on said processor the two data curves having a discharge pressure which is closest in value to said sensed pressure for the selected flow rate, the proportionate difference of the sensed discharge pressure from the discharge pressure of the closest two data curves for the selected flow rate, and a desired pump speed which is proportionately same difference in value between the pump speeds of the closest two data curves as the sensed discharge pressure is between the values of the discharge pressure of said closest two data curves for the selected flow rate.

\* \* \* \* \*